United States Patent [19]

Adams et al.

[11] Patent Number: 4,716,983
[45] Date of Patent: Jan. 5, 1988

[54] TORQUE SENSING VEHICLE STEERING SYSTEM

[75] Inventors: Frederick J. Adams, Clevedon; Kenneth Chandler, Bristol, both of Great Britain

[73] Assignee: TRW Cam Gears Limited, Hitchin, Great Britain

[21] Appl. No.: 822,829

[22] Filed: Jan. 27, 1986

[30] Foreign Application Priority Data

Jan. 30, 1985 [GB] United Kingdom ............... 8502276

[51] Int. Cl.$^4$ .............................................. B62D 5/00
[52] U.S. Cl. .................................... 180/142; 180/79.1
[58] Field of Search .............. 180/79, 141, 142, 147, 180/148, 79.1, 149; 74/388 PS; 318/1, 2

[56] References Cited

U.S. PATENT DOCUMENTS

| | | | |
|---|---|---|---|
| 2,930,247 | 3/1960 | Zinn | 180/79.1 |
| 4,223,254 | 9/1980 | Adams | 180/79.1 |
| 4,366,768 | 1/1983 | Kulischenko | 180/79.1 |
| 4,437,531 | 3/1984 | Urabe | 180/79.1 |

FOREIGN PATENT DOCUMENTS

| | | | |
|---|---|---|---|
| 47251 | 3/1982 | Japan | 180/79.1 |
| 227561 | 12/1984 | Japan | 180/79.1 |
| 2113845 | 8/1983 | United Kingdom . | |

*Primary Examiner*—David M. Mitchell
*Assistant Examiner*—Everett G. Diederiks, Jr.
*Attorney, Agent, or Firm*—Tarolli, Sundheim & Covell

[57] ABSTRACT

A steering system has annular pressure responsive electric components, such as piezo-electric transducers, mounted between thrust and restraining faces respectively, the transducers respond to a mechanical load applied to them by generating or determining electrical signals which are proportional to the load, the signals are supplied to a comparator by way of electrical connections. The transducers are arranged in pairs on the axially opposed faces of a bearing, so that in response to an axial thrust applied to the bearing by an input shaft of a steering gear incorporated in the system, the signals provided by the transducers will change from a predetermined comparative condition, one signal increasing in response to the increased compressive load on one transducer, the other signal decreasing in response to a decrease in compressive load on the other transducer in the pair. The predetermined comparative condition is established by compressing the transducer pair during installation by means of a retaining cap, which is screw threadedly connected to a housing. The changes in the electrical signal enable the comparator to determine the magnitude and direction of the thrust and to use this information for monitoring or control purposes.

13 Claims, 3 Drawing Figures

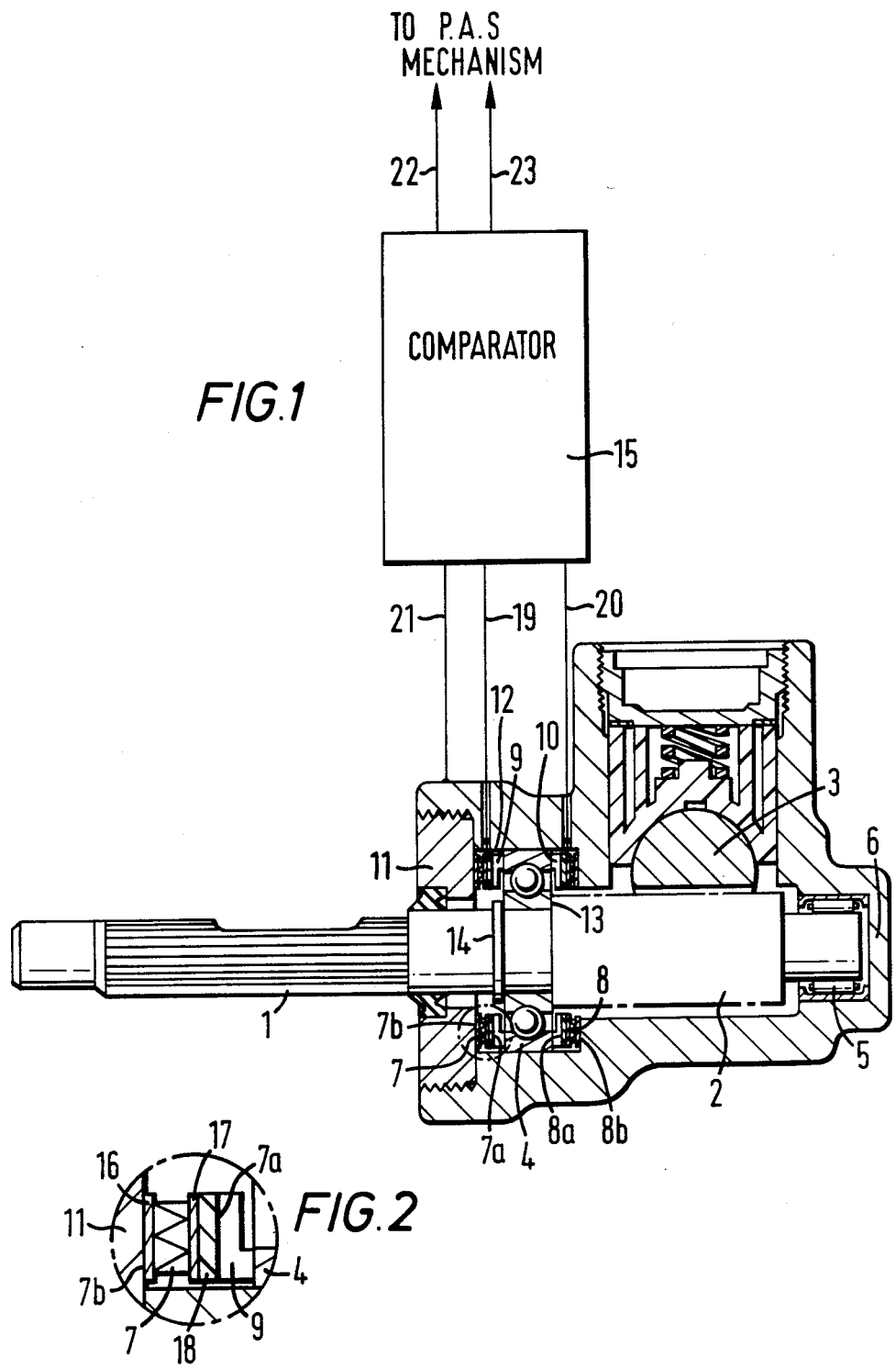

TORQUE SENSING VEHICLE STEERING SYSTEM

TECHNICAL FIELD AND BACKGROUND ART

This invention relates to vehicle steering systems, more particularly to such systems where variations in mechanical load are sensed during a steering manoeuvre to provide a signal which serves for monitoring or control purposes. The invention was primarily developed for use with power assisted steering gears for motor vehicles.

It has hitherto been proposed to provide devices in a steering mechanism which are responsive to variations in mechanical loads in the system caused by effecting a steering manoeuvre and to provide an output from such devices which can be used to control power assistance. Several such devices have been proposed; a first of these uses a potentiometer to measure the mechanical loads whereby a slider on the potentiometer is connected by a linkage to a member in the steering mechanism (the load on which member it is desired to detect) so that the slider is moved by the linkage in proportion to the load—thereby changing the electrical resistance of the potentiometer and ultimately to provide a required output signal. In the case of power assisted steering mechanisms the output signal which results from the change in electrical resistance can be used to control power assistance which may be provided by servo motors to the system. This type of known device usually employs a slip ring potentiometer which is mounted on the input shaft of the steering gear. Because of safety requirements this type of device requires very careful and trouble free construction and is consequently expensive, furthermore it has the disadvantage that the moving contacts and linkage of the potentiometer are susceptible to wear and interference for example by corrosion and extraneous matter.

A second type of known device depends upon the carbon pile effect for its operation whereby the load to be measured is transmitted to an appropriate material (such as carbon) to stress that material and thereby change its electrical resistance, the changes in resistance can be detected in a similar fashion to the first type of device and hence the load can be determined.

A third type of known device (as exemplified by British Specification No. 2,030,094A) employs a "force rod sensor" which enables either one of two electrical circuits to be closed (depending on the direction of load applied) and this serves to indicate to a control device the direction of the load so that the control device can respond accordingly.

In the prior proposals as discussed above, a fault in the system (such as a failure of an electrical connection) may be interpreted as a change in the load which is being sensed, and for a steering system it will be appreciated that this is most undesirable.

It is an object of the present invention to provide a steering system which alleviates the disadvantages of the prior proposals and lends itself to a reliable, compact and inexpensive structure for detecting and responding to variations in mechanical load effected by a steering manoeuvre whereby an output signal is provided which can be used for monitoring or control purposes associated with the steering.

STATEMENT OF INVENTION AND ADVANTAGES

According to the present invention there is provided a vehicle steering system comprising a thrust component which is axially displaceable relative to a housing part in response to an axial load developed during a steering manoeuvre; two axially opposed thrust faces on said component which respectively oppose, one each, two restraining faces on said housing part, one restraining face and the thrust face that opposes it forming one pair of faces which restrain the thrust component from said axial displacement in one direction, and the other restraining face and the thrust face which opposes it forming a second pair of faces which restrain the thrust component from said axial displacement in the opposite direction; two pressure responsive electrical components located one each between the opposed faces in said pairs to provide variations in electrical signals in response to the thrust developed thereon by pressure from the respectively opposed faces in restraining axial displacement of the thrust component, and a comparator to which said signals are applied, said comparator comparing said signals with a neutral and serving to emit a control signal for control or monitoring purposes in the system when said signals deviate from a predetermined comparative condition.

The two pressure responsive electrical components may be of a form whereby it is necessary for an externally developed electrical signal to be applied thereto so that the signal is varied as a result of variations in pressure to which the electrical components are subjected, as for example, in the case of pressure responsive resistors or capacitors. Preferably however the pressure responsive electrical components are in the form of piezo-electric transducers which develop their own respective signals when subjected to pressure.

Advantageously the pressure responsive electrical components are incorporated in a steering gear of the system whereby an input shaft to the gear serves as the thrust component. The thrust faces may be provided by axially opposite sides of a flange on the thrust component, such as a bearing which is axially displaceable with, and rotatably mounts, the input shaft in the housing and the restraining faces may be formed by opposed faces of a cavity in the housing in which cavity the input shaft and bearing are received. Preferably the bearing has a non-rotatable outer race and the electrical components are subjected to loading from this outer race so that the frictional wear on those is alleviated. Alternatively the restraining faces can be located on axially opposite sides of a flange or bearing on the housing and the thrust faces can be formed in a rebate in the thrust component within which rebate the flange or bearing is received.

The pressure responsive electrical components can be made as axially thin annular elements so that they are very compact within the steering gear.

The system is preferably arranged to monitor torque loads or reactions on an input shaft of a steering gear which results from a steering manoeuvre, as occurs, for example, in a rack and helical pinion or worm type steering gear. In such an arrangement the helical pinion or worm, in driving the teeth of an output rack or gear, imparts an axial thrust or reaction to the input shaft of the gear, which axial thrust can then be detected by the system, assessed by the comparator and an output signal provided for control or monitoring.

The predetermined neutral or comparative condition may be established by compressing the electrical components during their installation in the housing so that those components result in continuous signals (which may be of similar value for each) when no load is applied to the thrust component. Use of this predetermined comparative condition can provide a fail safe feature in the system whereby if the signals from the electrical components to the comparator do not change within a predetermined range and relative to the neutral condition (and in opposite senses) in response to a steering manoeuvre, a fault will likely have occurred in the system; this can appropriately be detected and indicated by the comparator. The compression of the electrical components can be achieved by use of a retaining cap which secures the input shaft and electrical components within the housing and also provides one of the restraining faces. The output signal from the comparator can serve for monitoring purposes, for example during testing or development of a steering gear or for control purposes such as determining the operation of a valve, pump or switch for control of a servo motor in providing power assistance to the steering manoeuvre.

Because the system lends itself to using the input shaft of a steering gear as the thrust component and the pressure responsive electrical components can be incorporated in the steering gear housing, no complex linkages are involved, the electrical components are not subjected to wear and extraneous matter, and a compact low cost assembly can be provided.

DRAWINGS

Embodiments of the steering system constructed in accordance with the present invention will now be described, by way of example only, with reference to the accompanying illustrative drawings in which:

FIG. 1 shows a sectional view through a steering gear incorporated in a first embodiment of the system of the present invention;

FIG. 2 shows an enlarged sectional view of part of a piezo-electric transducer incorporated in the gear of FIG. 1.

DETAILED DESCRIPTION OF DRAWINGS

Figure 3:
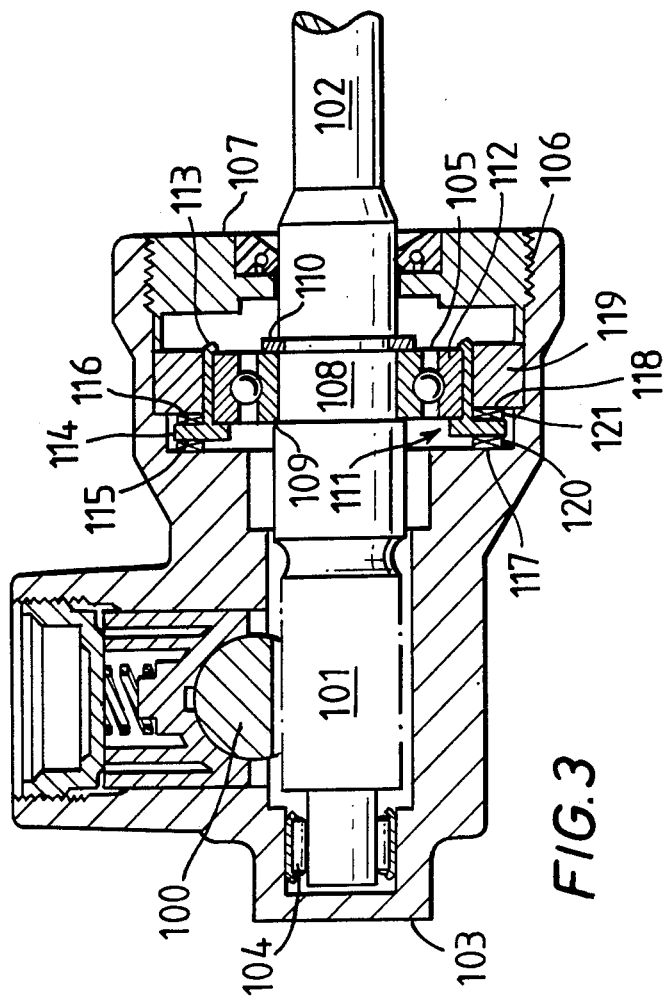
FIG. 3 shows a sectional view through a steering gear for incorporation in a second embodiment of the system of the present invention.

The steering gear illustrated in FIG. 1 is of the well known helical rack and pinion type, having an axially extending input shaft 1 coupled to a helical gear pinion part 2 which meshes with a toothed rack 3. The input shaft and pinion part are rotatably mounted by first and second bearing means 4 and 5 respectively within a cavity formed by a housing 6 so that the rack will be displaced in response to rotation of the input shaft about its axis.

A pair of annular piezo-electric transducers 7 and 8 are mounted, one each, axially between axially opposed thrust and restraining faces 7a and 7b and 8a and 8b respectively and concentric with the shaft 1. The bearing 4 has inner and outer races of which the inner race is rotatable with the shaft 1 and relative to the outer race. The thrust faces 7a and 8a are provided by annular spacers 9 and 10 respectively which abut opposite sides of the outer race of the bearing 4 (this outer race is not intended to rotate with respect to the housing so that the transducers are not subjected to wear by rubbing between the abutting faces). The restraining face 7b is provided by a removable retaining cap 11 which is screw threadedly connected to the housing. The restraining face 8b is on the housing 6 and is formed by a rebate 12 in the cavity of the housing. The transducers 7 are preloaded by arranging that the axial length between the faces 7b and 8b is slightly less than that of the transducers/ spacers/ bearing assembly. The bearing 4 is suited to support both axial and radial loading and has its inner race axially retained against a shoulder 13 on the input shaft (conveniently by means of a retaining ring 14 on the input shaft).

Each transducer (as illustrated in FIG. 2 for the transducer 7) comprises a thin annular element of piezo-electric material (such as quartz) which has metallic electrical contacting layers 16 and 17 bonded to its two axially opposed and aligned faces. The layer 16 abuts the restraining face 7b of the cap 11 so that the face is in good electrical contact with the cap and thereby the housing. The layer 17 is insulated from the spacer 9 (and hence from the bearing and housing by means of an insulating layer 18 located between the contacting layer 17 and the spacer 9. The transducer 8 is assembled in a similar manner to the transducer 7 but is installed with its uninsulated layer abutting the restraining face 8b. Any electrical signals generated by the transducers are transmitted to a comparator 15 by way of conduits 19, 20 and 21—conduits 19 and 20 respectively connecting with the insulated faces 17 of the transducers and conduit 21 connecting the uninsulated faces 16 by way of the housing 6.

During assembly of the system the pinion and input shaft carrying the bearing 4 and transducer assembly are inserted into the cavity in the housing by way of a side port in the housing and are then retained in the housing by means of the cap 11 which closes the side port. Because the axial spacing between the faces 7b and 8b is shorter than the transducers/bearing assembly, the transducers will be compressed on fitting the cap so that signals will be continuously emitted to the comparator by the transducers. These signals (which may be the same for each transducer) are sensed by the comparator to develop a neutral signal which will serve for comparison purposes and this neutral signal may have its magnitude varied by adjusting the torque applied to the retaining cap during assembly.

When a steering manoeuvre takes place a torque will be applied to the pinion by the rack and, since the pinion is a helical gear, there will be a reaction or axial thrust developed on the input shaft, the magnitude and direction of this thrust being dependent on the magnitude and direction of the torque which is applied to the pinion. The reaction or axial thrust on the shaft will be applied by way of the outer race of bearing 4 to the transducers 7, 8 to increase the compression on one and reduce the compression on the other by similar amounts. Consequently a change in the electrical signals from the transducers will result which is proportional to the change in compressive loads on the transducers. The variation in signals will be assessed by the comparator and compared with the neutral or comparative signal as aforementioned to provide an output or control signal by way of conduits 22 and 23. The output signal may be applied to control operation of a power assisting device (not shown) which is incorporated in the system to provide power assistance to the displacement of the rack 3.

In the event that one or other of the transducers or the electrical connections fail, an imbalance will be detected by the comparator so that an appropriate signal can be emitted to indicate that a fault exists in the system.

The embodiment of steering gear in FIG. 3 is similar, in many general aspects, to that shown in FIG. 1 and has a rack bar 100 mounted to be displaced by rotation of a pinion part 101 of an input shaft 102. The rack bar, pinion part and input shaft are mounted in a housing 103. The pinion part 101 and input shaft 102 are respectively rotatably mounted by a roller bearing 104 and a ball bearing 105 having inner and outer races. The bearing 105 is mounted on a part 108 of the input shaft 102 and is restrained from axial displacement relative to the input shaft by abutment of the inner race of the bearing axially between a shoulder 109 and a ring clip 110 on the input shaft. The bearing 105 is located in the housing 103 adjacent to an aperture 106 of the housing within which aperture is fitted a screw cap 107.

Securely mounted on the outer race 112 of the bearing 105 is an annular element 111 having a cylindrical sleeve part 113 within which the outer race 112 is received. The element 111 has a flange part 114 which extends radially from one end of the sleeve part 113 and is press fitted to the outer race 112 so that the latter is secured between the flange part 114 and a turned-over end of the sleeve part 113. A radially outwardly extending portion of the flange part 114 has axially opposed faces which provide thrust faces 115 and 116 respectively. Axially opposite to the thrust face 115 is a restraining face 117 provided by an internal shoulder of the housing 103. Axially opposite to the thrust face 116 on the flange part is a restraining face 118 provided by an annular member 119 which is slidably received in the housing 103 through the aperture 106 so that the ring member closely receives therein the sleeve part 113. Located between the respective pairs of opposed thrust and restraining faces 115, 117 and 116, 118 are thin annular piezo-electric elements 120 and 121 respectively. The elements 120 and 121 are compressed between their respectively associated faces by axial forces applied thereto through the ring member 119 and by adjustment of the screw cap 107 which latter extends axially to abut the ring member 119.

The piezo-electric elements 120 and 121 are electrically connected in the vehicle steering system in a similar manner to that previously described with reference to FIG. 1 with the faces of the piezo-electric elements which abut the restraining faces 117 and 118 in electrical contact while the faces of the piezo-electric elements in contact with the thrust faces 115 and 116 are electrically insulated therefrom.

The operation of the system incorporating the steering gear of FIG. 3 is substantially the same as that previously described with reference to FIGS. 1 and 2. However, the arrangement of the piezo-electric elements 120 and 121 as shown in FIG. 3 permits those elements to be positioned nearer to each other in comparison with the arrangement shown in FIG. 1 (because the flange part 114 can be made axially thin in comparison with the bearing 4). Piezo-electric elements are frequently sensitive to temperature changes and a significant temperature differential between the two elements incorporated in the present embodiments could result in inaccurate sensing and response by the system; however the facility to locate the two elements 120 and 121 in close proximity to each other as envisaged by the embodiment of FIG. 3 permits those elements to be maintained at substantially the same temperature and thereby alleviate the aforementioned disadvantage.

We claim:

1. A vehicle steering system comprising a thrust component, means for generating an axial load on said thrust component proportional to an input steering torque applied to the system during a steering manoeuvre, two axially opposed thrust faces on said thrust component each of which respectively opposes one of two restraining faces on a housing part, one restraining face and the thrust face which opposes it forming one pair of faces which restrain said thrust component from axial displacement in one direction, and the other restraining face and the thrust face which opposes it forming a second pair of faces which restrain said thrust component from axial displacement in the direction opposite to said one direction, two pressure responsive electrical components each located between the respective opposed faces of said pairs to provide variations in electrical signals proportional to the thrust developed thereon by pressure from the respectively opposed thrust faces in restraining axial displacement of said thrust component, a comparator to which said signals are applied, said comparator comparing said signals with a neutral and emitting a control signal when said signals deviate from a predetermined comparative condition for controlling operation of power assist means that provides power assist to operation of said steering system, and a flange part mounted on said thrust component and having said opposed thrust faces, the housing part comprising a cavity within which the flange part is received and which defines said restraining faces, the flange part being mounted on a bearing which rotatably mounts said thrust component.

2. A system as claimed in claim 1 in which the electrical components are mounted to be responsive to pressure from an outer bearing race which is nonrotatable relative to the housing part.

3. A system as claimed in claim 1 wherein said flange part is carried by the outer bearing race of said bearing and has a portion extending radially from the outer bearing race.

4. A system as claimed in claim 3 wherein said flange part comprises a sleeve part within which the outer bearing race is received and which is secured to the outer bearing race.

5. A vehicle steering system comprising a thrust component, means for generating an axial load on said thrust component proportional to an input steering torque applied to the system during a steering manoeuvre, two axially opposed thrust faces on said thrust component each of which respectively opposes one of two restraining faces on a housing part, one restraining faces and the thrust face which opposes it forming one pair of faces which restrain said thrust component from axial displacement in one direction, and the other restraining face and the thrust face which opposes it forming a second pair of faces which restrain said thrust component from axial displacement in the direction opposite to said one direction, two pressure responsive electrical components each located between the respective opposed faces of said pairs to provide variations in electrical signals proportional to the thrust developed thereon by pressure from the respectively opposed thrust faces in restraining axial displacement of said thrust component, and a comparator to which said signals are applied, said comparator comparing said signals with a neutral and emitting a control signal when said signals deviate from a predetermined comparative condition for controlling operation of power assist means that provides power assist to operation of said steering system, said pressure responsive electrical components being preloaded so that continuous electrical signals results, said signals being applied to said comparator to determine a comparative condition, said steering system further including means comprising a cap screw threadedly secured to the housing for preloading said pressure responsive electrical components, the preload being adjusted by the amount of torque applied to the cap screw during assembly of the steering system.

6. A system as claimed in claim 5 in which the cap screw partly defines a cavity in the housing part, said thrust faces being located on axially opposed sides of a flange part on the thrust component within the cavity and said restraining faces being formed in the cavity.

7. A vehicle steering system comprising a thrust component, means for generating an axial load on said thrust component proportional to an input steering torque applied to the system during a steering manoeuvre, two axially opposed thrust faces on said thrust component each of which respectively oppose one of two restraining faces on a housing part, one restraining face and the thrust face which opposes it forming one pair of faces which restrain said thrust component from axial displacement in one direction, the other restraining face and the thrust face which opposes it forming a second pair of faces which restrain said thrust component from axial displacement in the direction opposite to said one direction, two preloaded pressure responsive electrical components each located between the respective opposed faces of said pairs to provide simultaneously, variations in electrical signals proportional to the thrust developed thereon by pressure from the respectively opposed thrust faces in restraining axial displacement of said thrust component, and a comparator to which said signals are applied, said comparator comparing said signals with a neutral and emitting a control signal when said signals deviate from a predetermined comparative condition for controlling operation of power assist means that provides a power assist to operation of said steering system said comparator further functioning to detect a system fault when the simultaneous signals from the electrical components to the comparator do not change within a predetermined range and relative to the neutral in response to the steering manoeuvre.

8. A system as claimed in claim 7 in which the electrical components comprise annular elements having two faces which axially oppose the thrust and restraining faces, one said face of each electrical component being electrically connected solely to the comparator and the other said face of each electrical component being electrically connected to the housing part to provide a common connection to the comparator.

9. A system as claimed in claim 7 wherein said thrust component comprises an input shaft rotatable in response to the input steering torque applied to said system, and said means for applying an axial load to said thrust component comprises gear means fixedly mounted on said input shaft for joint rotation therewith, said gear means having helical teeth theron cooperating with respective teeth on an output member for effecting axial movement of said output member in response to rotation of said input shaft, said output member applying an axial thrust force to said gear means and, thus, to said input shaft in response to axial movement of said output member.

10. A vehicle steering system comprising a thrust component, means for generating an axial load on said thrust component proportional to an input steering torque applied to the system during a steering manoeuvre, two axially opposed thrust faces on said thrust component each of which respectively opposes one of two restraining faces on a housing part, one restraining face and the thrust face which opposes it forming one pair of faces which restrain said thrust component from axial displacement in one direction, and the other restraining face and the thrust face which opposes it forming a second pair of faces which restrain said thrust component from axial displacement in the direction opposite to said one direction, two pressure responsive electrical components each located between the respective opposed faces in said pairs to provide variations in electrical signals proportional to the thrust developed thereon by pressure from the respectively opposed thrust faces in restraining axial displacement of said thrust component, a comparator to which said signals are applied, said comparator comparing said signals with a neutral and emitting a control signal when said signals deviate from a predetermined comparative condition for controlling operation of power assist means that provides power assist to operation of said steering system, and a bearing mounted on said thrust component and supporting said thrust component for rotation relative to said housing part, said bearing having a non-rotatable outer bearing race that supports said axially opposed thrust faces for applying pressure to said pressure responsive electrical components in response to an axial load acting on said thrust component.

11. A system as claimed in claim 10 in which the thrust faces are located on axially opposite side faces of the outer bearing race.

12. A system as claimed in claim 10 in which the comparator is arranged to indicate the existence of a fault if the signals determined by the electrical components fail or a differential in signals is indicated which varies from a predetermined range of signals from the comparative condition.

13. A system as claimed in claim 10 in which the two pressure responsive electrical components are piezoelectric transducers.

* * * * *